(12) United States Patent
Zala et al.

(10) Patent No.: US 12,039,326 B2
(45) Date of Patent: Jul. 16, 2024

(54) CLOUD-BASED COMPUTER WITH RUNTIME-MAPPED SOFTWARE VERSIONS

(71) Applicant: ARRIS Enterprises LLC, Suwanee, GA (US)

(72) Inventors: Rajeshwari Zala, Sunnyvale, CA (US); Rajul Harkishan Vora, San Jose, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 122 days.

(21) Appl. No.: 17/279,808

(22) PCT Filed: Oct. 30, 2020

(86) PCT No.: PCT/US2020/058228
§ 371 (c)(1),
(2) Date: Mar. 25, 2021

(87) PCT Pub. No.: WO2021/201914
PCT Pub. Date: Oct. 7, 2021

(65) Prior Publication Data
US 2022/0308863 A1    Sep. 29, 2022

Related U.S. Application Data

(60) Provisional application No. 63/003,018, filed on Mar. 31, 2020.

(51) Int. Cl.
*G06F 9/44*      (2018.01)
*G06F 8/71*      (2018.01)
(Continued)

(52) U.S. Cl.
CPC ............ *G06F 8/71* (2013.01); *H04L 47/2441* (2013.01); *H04L 47/2491* (2013.01); *H04L 61/5014* (2022.05)

(58) Field of Classification Search
None
See application file for complete search history.

(56) References Cited

U.S. PATENT DOCUMENTS 6,637,023 B1    10/2003    Ginsberg
11,212,224 B1*  12/2021    Austin ................... H04L 45/54
(Continued)

FOREIGN PATENT DOCUMENTS

KR    10-0310304       12/2001
KR    100310304 B1     12/2001

OTHER PUBLICATIONS

"International Search Report and Written Opinion of the International Searching Authority, for International Application No. PCT/US2020/058228, dated Feb. 22, 2021".

(Continued)

*Primary Examiner* — Wei Y Zhen
*Assistant Examiner* — Lanny N Ung
(74) *Attorney, Agent, or Firm* — Steven Stupp

(57) ABSTRACT

A computer that dynamically maps traffic to different versions of software is described. During operation, the computer may receive first traffic from a first tenant and second traffic from a second tenant, where the first traffic and the second traffic are addressed to a common computing environment that supports multiple, different tenants. Then, the computer may identify the first tenant based at least in part on first information included in the first traffic, and may identify the second tenant based at least in part on second information included in the second traffic. Moreover, the computer may dynamically map the first traffic to a first version of software and the second traffic to a second version of the software, where the dynamic mapping occurs at (Continued)

runtime. Note that the computer may concurrently execute the first version of the software and the second version of the software.

20 Claims, 5 Drawing Sheets

(51) Int. Cl.
*H04L 47/2441* (2022.01)
*H04L 47/2491* (2022.01)
*H04L 61/5014* (2022.01)

(56) References Cited

U.S. PATENT DOCUMENTS

| | | | |
|---|---|---|---|
| 2008/0201703 A1* | 8/2008 | Lerum | G06F 40/30 |
| | | | 717/172 |
| 2009/0090037 A1 | 4/2009 | Arndt et al. | |
| 2014/0088983 A1* | 3/2014 | Neff | G16H 40/67 |
| | | | 705/2 |
| 2014/0090037 A1 | 3/2014 | Singh | |
| 2016/0127071 A1 | 5/2016 | Brassil | |
| 2017/0346682 A1 | 11/2017 | Ni et al. | |
| 2017/0371641 A1* | 12/2017 | Spieler | G06F 8/65 |
| 2019/0158397 A1* | 5/2019 | Liu | H04L 12/4633 |
| 2021/0165731 A1* | 6/2021 | Ross | G06F 11/3692 |

OTHER PUBLICATIONS

International Search Report and Written Opinion, International Application No. PCT/US2020/058228, dated Mar. 31, 2020.

* cited by examiner

CLOUD-BASED COMPUTER WITH RUNTIME-MAPPED SOFTWARE VERSIONS

This application claims priority under 35 U.S.C. 371 to International Application No. PCT/US2020/058228, "Cloud-Based Computer with Runtime-Mapped Software Versions," by Rajeshwari Zala, et al., filed on Oct. 30, 2020 which claims priority under 35 U.S.C. 119(e) to: U.S. Provisional Application Ser. No. 63/003,018, "Cloud-Based Computer with Runtime-Mapped Software Versions," filed on Mar. 31, 2020, by Rajeshwari Zala, the contents of both of which are herein incorporated by reference.

BACKGROUND

Field

The described embodiments relate to techniques for selective software releases. Notably, the described embodiments relate to techniques for dynamically mapping customer traffic to different software versions at runtime.

Related Art

After development and internal testing, a new version of software may be released to the entire customer base at the same time. However, this testing approach usually requires a high degree of maturity and quality in the new version of the software prior to release. This can increase the development and testing time, and thus can increase the expense of the new version of the software.

Consequently, the new version of software may be released to a selected subset of customers for so-called 'beta testing' or 'pre-release testing'. This testing approach allows the new version of the software to be tested in real-world conditions by a limited audience, and provides feedback to the developers so they can correct any identified issues or problems prior to a general release of the new version of the software.

For example, beta testing can be readily implemented when selected customers install the new version of the software on their local computers. Alternatively, selected customers can be directed to a Web portal, where they can access the new version of the software.

However, it can be difficult to implement beta testing in some cloud-based computing systems. Notably, in a cloud-based computing system, multiple different customers may access and use a common computing environment, including a common version of the software. Consequently, it can be difficult for a selected subset of these customers to access and use the new version of the software via this common computing environment, while a remainder of the customers access and use a different version of the software.

SUMMARY

A computer that dynamically maps traffic to different versions of software is described. This computer may include: an interface circuit that communicates with one or more electronic devices; a processor; and a memory that stores program instructions, where, when executed by the processor, the program instructions cause the computer to perform operations. Notably, during operation, the computer may receive first traffic from a first tenant and second traffic from a second tenant, where the first traffic and the second traffic are addressed to a common computing environment that supports multiple, different tenants. Then, the computer may identify the first tenant based at least in part on first information included in the first traffic, and may identify the second tenant based at least in part on second information included in the second traffic. Moreover, the computer may dynamically map the first traffic to a first version of software and the second traffic to a second version of the software, where the dynamic mapping occurs at runtime.

Note that given traffic may include packets or frames. Moreover, the dynamic mapping may involve injecting, adding or setting a bit or a flag in a header in a given packet or a given frame in the given traffic. For example, the injection may use a general-purpose remote procedure call (GRPC).

Furthermore, a given tenant may include one or more customers.

Additionally, given information in the first information or the second information may include an identifier associated with a given tenant. For example, the identifier may include: a media access control (MAC) address, an Internet Protocol (IP) address, or tenant or customer qualifying information (such as a tenant identifier). The given information may be included in a header in a given packet or a given frame in the given traffic.

In some embodiments, the computer may receive, from the second tenant, feedback about the second version of the software. Based at least in part on the feedback, the computer may release the second version of the software to the multiple tenants. Consequent, when the computer subsequently receives additional traffic from the first tenant, the computer may dynamically map the additional traffic to the second version of the software.

Note that the dynamic mapping may be based at least in part on predefined preferences or acceptance information of the first tenant and the second tenant. For example, the second tenant may have agreed or opted-in to using the second version of the software.

Moreover, the computer may run or execute the first version of the software and the second version of the software concurrently.

Another embodiment provides a computer-readable storage medium with program instructions for use with the computer. When executed by the computer, the program instructions cause the computer to perform at least some of the aforementioned operations in one or more of the preceding embodiments.

Another embodiment provides a method, which may be performed by the computer. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

A computer that dynamically maps traffic to different versions of software is described. During operation, the computer may receive first traffic from a first tenant and second traffic from a second tenant, where the first traffic and the second traffic are addressed to a common computing environment that supports multiple, different tenants. Then, the computer may identify the first tenant based at least in part on first information included in the first traffic, and may identify the second tenant based at least in part on second information included in the second traffic. Moreover, the computer may dynamically map the first traffic to a first version of software and the second traffic to a second version of the software, where the dynamic mapping occurs at runtime. Note that the computer may concurrently execute the first version of the software and the second version of the software.

By dynamically mapping the traffic, these mapping techniques may allow versions of the software to be flexibly tested and released. For example, the mapping techniques may allow rapid development and real-world testing of incremental changes to a current version of the software (such as adding or changing a feature). This is in contrast to existing approaches, in which multiple features are bundled together in a quarterly or semi-annual software update because of testing constraints. Consequently, the mapping techniques may reduce the time and expense associated with testing and deploying a new version of software. This capability may allow the software to be updated frequently or continuously, which may improve the quality of the software and customer service.

We now describe some embodiments of the mapping techniques. In the discussion that follows, a wired communication protocol, such as an IEEE 802.3 standard (which is sometimes referred to as 'Ethernet'), is used as an illustrative example. However, a wide variety of wired or wireless communication techniques or protocols may be used during communication of packets or frames between electronic devices. For example, a given electronic device may communicate packets or frames using: an Institute of Electrical and Electronics Engineers (IEEE) 802.11 standard (which is sometimes referred to as 'Wi-Fi,' from the Wi-Fi Alliance of Austin, Texas), Bluetooth (from the Bluetooth Special Interest Group of Kirkland, Washington), a cellular-telephone or data network (such as using a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), another type of wireless interface and/or another type of wired interface.

Figure 1:
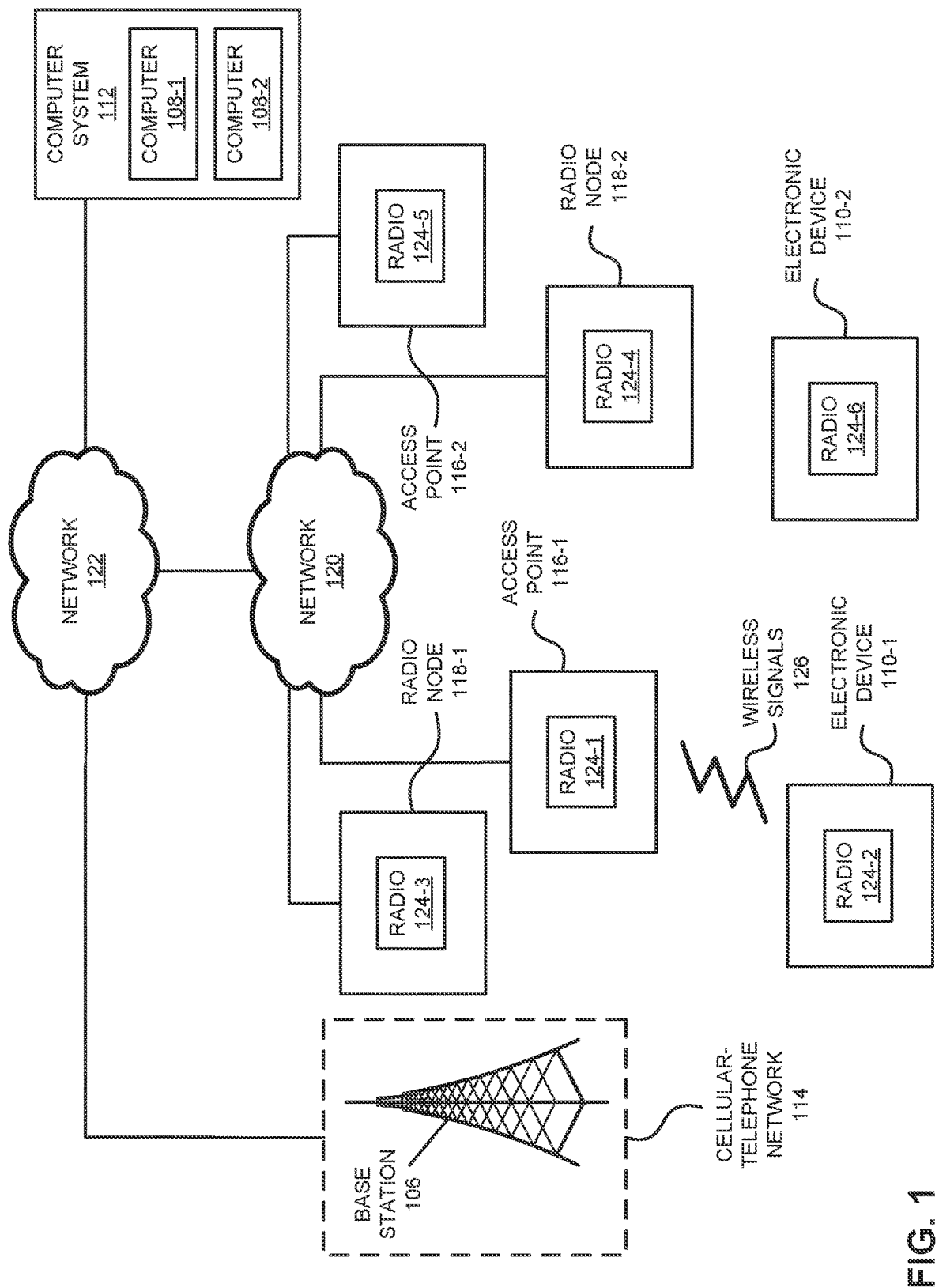
FIG. 1 is a block diagram illustrating an example of communication among electronic devices and a computer system in accordance with an embodiment of the present disclosure.

FIG. 1 presents a block diagram illustrating an example of communication among electronic devices and a computer system according to some embodiments. Notably, electronic devices 110 (such as cellular telephones, stations or clients, another type of electronic device, etc.) may communicate with computer system 112 (with one or more computers 108) via a cellular-telephone network 114 (which may include a base station 106), one or more access points 116 (which may communicate using Wi-Fi) and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc.

Note that access points 116 may communicate with each other and/or computer system 112 (which may be a cloud-based controller that manages and/or configures access points 116) using a wired communication protocol (such as Ethernet) via network 120 and/or 122. Similarly, radio nodes 118 may communicate with each other and/or computer system 112 (which may be a cloud-based controller that manages and/or configures radio nodes 118) using a wired communication protocol (such as Ethernet) via network 120 and/or 122. Networks 120 and 122 may be the same or different networks. For example, networks 120 and/or 122 may an intra-net or the Internet.

Figure 2:
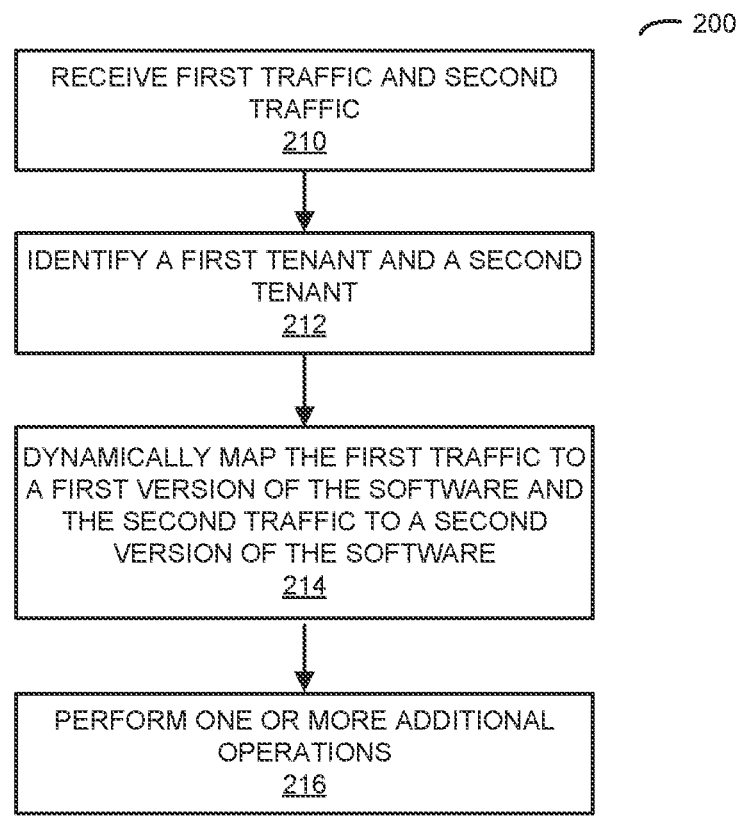
FIG. 2 is a flow diagram illustrating an example of a method for dynamically mapping traffic to different versions of software using the computer in FIG. 1 in accordance with an embodiment of the present disclosure.

As described further below with reference to FIGS. 2-4, computer system 112 may perform one or more of the mapping techniques during communication with one or more of a given one of electronic devices 110, a given one of access points 116 and/or a given one of radio nodes 118. Notably, electronic device 110-1 may be associated with a first tenant or group of customers of computer system 112, and electronic device 110-2 may be associated with a second tenant or group of customers of computer system 112. Note that computer system 112 may provide a common computing environment that supports multiple, different tenants, which may include or provide service to one or more customers. Thus, a given tenant may include a service provider (such as a mobile network operator, a managed service provider, a company, a government, an organization, etc.) that provides service to one or more customers.

Moreover, the second tenant may have agreed to or opted-in to using a second version of software (such as a new version of the software) that is executed or run by one or more of computers 108 in computer system 112. However, one or more of computers 108 in computer system 112 may concurrently execute or run one or more other versions of the software, such as a first version of the software (such as a current version or release of the software). In order to support the multiple versions of the software in a common computing environment for the multiple tenants, one or more of computers 108 (such as, e.g., computer 108-1) in computer system 112 may perform, at runtime, dynamically mapping of traffic to different versions of the software. Note that, in the present discussion, 'runtime' or 'execution time' may mean a time when at least a processor, a processor core, or, more generally, a processing engine is executing a complied or executable version of the software.

Notably, computer 108-1 may receive first traffic from electronic device 110-1 and second traffic from electronic device 110-2. Then, computer 108-1 may identify the first tenant based at least in part on first information included in the first traffic, and may identify the second tenant based at least in part on second information included in the second traffic. For example, given information in the first information or the second information may include an identifier associated with a given tenant. In some embodiments, the identifier may include: a MAC address, an IP address, or tenant or customer qualifying information (such as a tenant identifier). The given information may be included in a header in a given packet or a given frame in the first traffic or the second traffic.

Moreover, computer 108-1 may dynamically map, at runtime, the first traffic to the first version of software and the second traffic to a second version of the software, which are concurrently run or executed by computer 108-1. For example, the dynamic mapping may involve injecting, adding or setting a bit or a flag in a header in a given packet or a given frame in the first traffic or the second traffic. In some embodiments, the injection may use a GRPC (from Google, Inc. of Mountain View, California).

Note that the dynamic mapping may be based at least in part on predefined preferences or acceptance information of the first tenant and the second tenant, such as the prior agreement to opt-in to using the second version of the software.

Furthermore, computer 108-1 may receive, from electronic device 110-1, feedback about the second version of the software. Based at least in part on the feedback, computer 108-1 may release the second version of the software to the multiple tenants. Consequent, when computer 108-1 subsequently receives additional traffic from electronic device 110-1, computer 108-1 may dynamically map the additional traffic to the second version of the software. Note that in some embodiments, computer 108-1 may modify or change the second version of the software based at least in part on the feedback.

In this way, the mapping techniques may allow computer system 112 to concurrently execute or run a current version of the software while testing another version of the software. The dynamic runtime mapping of traffic to the different versions of the software may allow computer system 112 to flexibly map or route traffic from customers and/or tenants to different versions of the software. These capabilities may accelerate the development and testing of versions of the software in the common computing environment (as opposed to having different versions of the software being tested and/or running in different computing environments), which may facilitate rapid introduction of new or modified features. In addition, the dynamic mapping may allow a wide variety of versions of the software to be concurrently offered to different customers and/or tenants. Consequently, the mapping technique may enable shorter or continuous release times, reduced development and testing costs, improved service and/or tiered product offerings for different customers and/or tenants. For example, the dynamic mapping may allow versions of the software having different capabilities or features to be concurrently offered to customers and/or tenants. When a customer and/or tenant decides to change from one version to another, instead of upgrading their software, the dynamic mapping may provide an immediate and seamless transition.

In general, the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

During the communication in FIG. 1, access points 116 and/or radio nodes 118 and electronic devices 110 may wirelessly communicate while: transmitting access requests and receiving access responses on wireless channels, detecting one another by scanning wireless channels, establishing connections (for example, by transmitting connection requests and receiving connection responses), and/or transmitting and receiving frames that include packets (which may include information as payloads).

Figure 5:
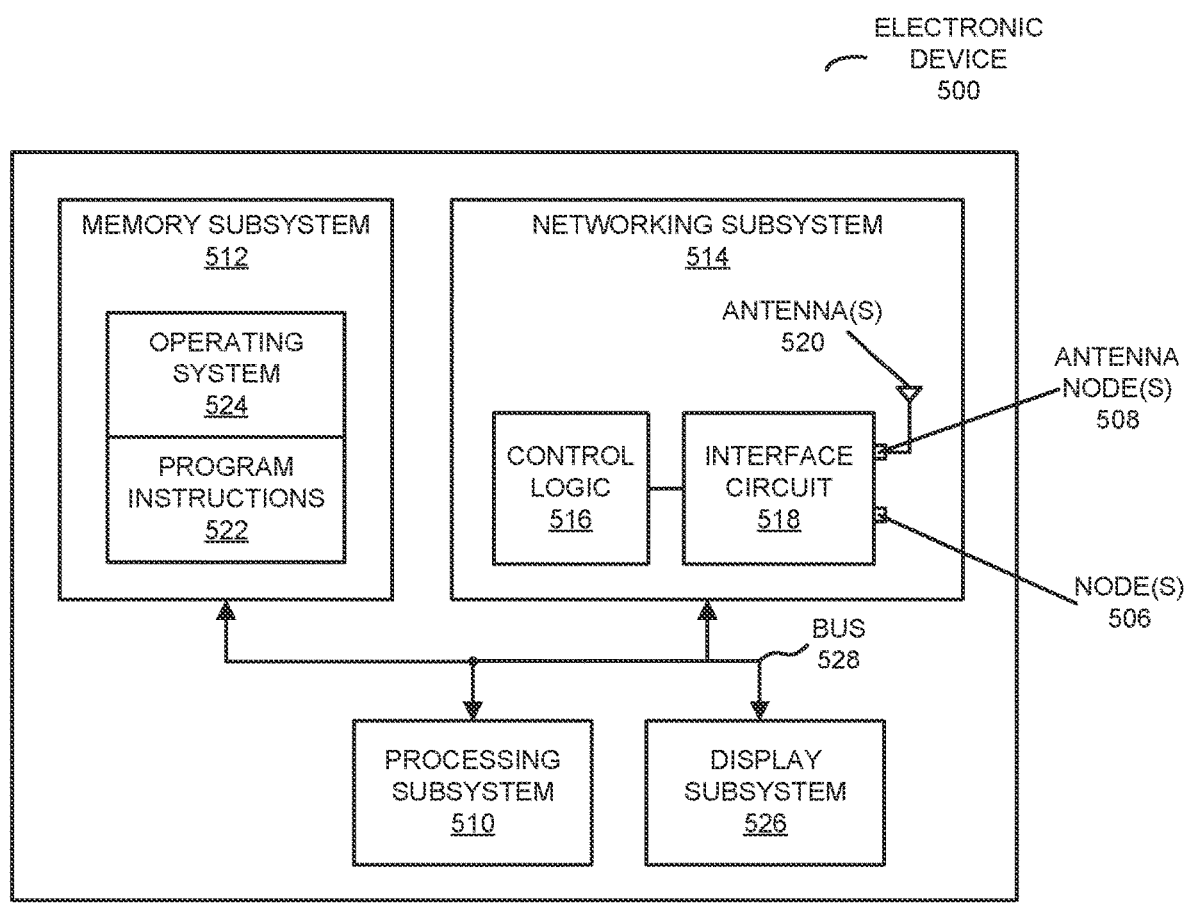
FIG. 5 is a block diagram illustrating an example of an electronic device in accordance with an embodiment of the present disclosure.

As described further below with reference to FIG. 5, electronic devices 110, access points 116 and radio nodes 118 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with each other. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

Moreover, as can be seen in FIG. 1, wireless signals 126 (represented by a jagged line) are transmitted by radios 124 in, e.g., access points 116 and/or radio nodes 118 and electronic devices 110. For example, radio 124-1 in access point 116-1 may transmit information (such as frames or packets) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey frames or packets.

In the described embodiments, processing a frame that includes packets in access points 116 and/or radio nodes 118 and electronic devices 110 may include: receiving the wireless signals with the frame; decoding/extracting the frame from the received wireless signals to acquire the frame; and processing the frame to determine information contained in the payload of the frame (such as the packet).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving frames that include packets. While note shown in FIG. 1, in some embodiments there may be one or more routers or switches.

In some embodiments, wireless communication between components in FIG. 1 uses one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol. Note that the communication between electronic devices may use multi-user transmission (such as orthogonal frequency division multiple access or OFDMA).

Moreover, computer system 112 may be implemented at a single location or may be implemented at multiple, different locations. Furthermore, a given one of the one or more access points 116 may be a physical access point or a virtual or 'software' access point that is implemented on a computer or an electronic device.

We now describe embodiments of the method. FIG. 2 presents a flow diagram illustrating an example of a method 200 for dynamically mapping traffic to different versions of software, which may be performed by a computer, e.g., in a computer system (such as one of computers 108 in computer system 112 in FIG. 1). During operation, the computer may receive first traffic (operation 210) from a first tenant and second traffic (operation 210) from a second tenant, where the first traffic and the second traffic are addressed to a common computing environment that supports multiple, different tenants. Then, the computer may identify the first tenant (operation 212) based at least in part on first information included in the first traffic, and may identify the second tenant (operation 212) based at least in part on second information included in the second traffic. Moreover, the computer may dynamically map the first traffic to a first version of software and the second traffic to a second version of the software (operation 214), where the dynamic mapping occurs at runtime.

Note that given traffic may include packets or frames. Moreover, the dynamic mapping may involve injecting, adding or setting a bit or a flag in a header in a given packet or a given frame in the given traffic. For example, the injection may use a GRPC.

Furthermore, a given tenant may include one or more customers.

Additionally, given information in the first information or the second information may include an identifier associated with a given tenant. For example, the identifier may include: a MAC address, an IP address, or tenant or customer qualifying information (such as a tenant identifier). The given information may be included in a header in a given packet or a given frame in the given traffic.

Note that the dynamic mapping may be based at least in part on predefined preferences or acceptance information of or associated with the first tenant and the second tenant. For example, the second tenant may have agreed or opted-in to using the second version of the software.

Moreover, the computer may run or execute the first version of the software and the second version of the software concurrently.

In some embodiments, the computer may optionally perform one or more additional operations (operation 216). For example, the computer may receive, from the second tenant, feedback about the second version of the software. Based at least in part on the feedback, the computer may release the second version of the software to the multiple tenants. Consequent, when the computer subsequently receives additional traffic from the first tenant, the computer may dynamically map the additional traffic to the second version of the software.

In some embodiments of method 200, there may be additional or fewer operations. Furthermore, the order of the operations may be changed, and/or two or more operations may be combined into a single operation. For example, while method 200 illustrated the dynamic mapping on a tenant basis, in some embodiments the dynamic mapping is based at least in part on a customer basis. Therefore, in these embodiments, the dynamic mapping may occur within a given tenant, alternatively or additionally to across different tenants.

Figure 3:
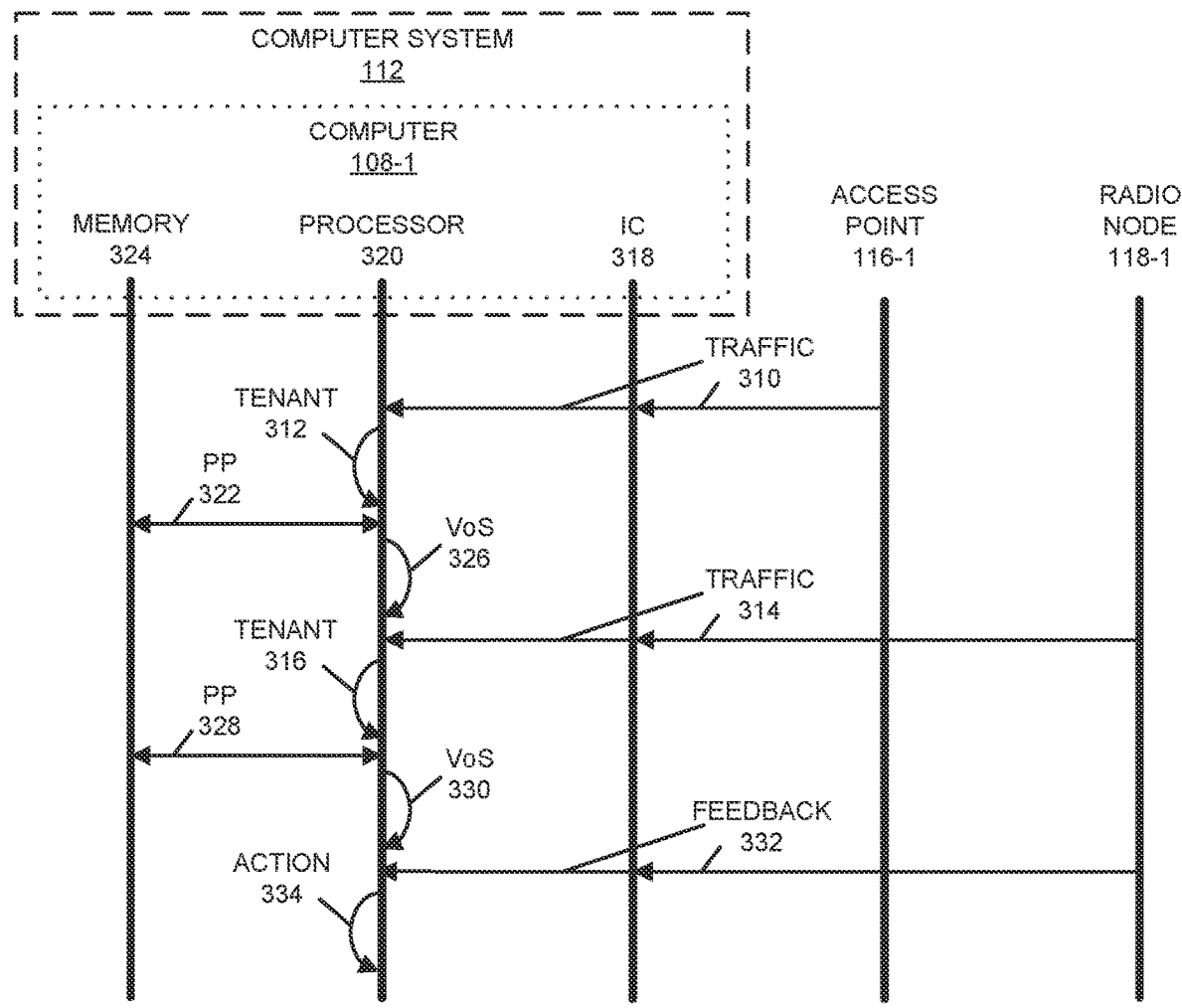
FIG. 3 is a drawing illustrating an example of communication among the electronic devices in FIG. 1 in accordance with an embodiment of the present disclosure.

Embodiments of the mapping techniques are further illustrated in FIG. 3, which presents a drawing illustrating an example of communication among access point 116-1, radio node 118-1 and computer 108-1 in computer system 112. In FIG. 3, access point 116-1 may provide traffic 310 (such as one or more packets or frames) associated with a tenant 312 to computer system 112, and radio node 118-1 may provide traffic 314 (such as one or more packets or frames) associated with a tenant 316 to computer system 112.

After receiving traffic 310, interface circuit (IC) 318 in computer 108-1 may provide traffic 310 to processor 320 in computer 108-1. Processor 320 may identify tenant 312 based at least in part on information included in traffic 310 (such as information in one or more headers in the one or more packets or frames). Then, based at least in part on predefined preference (PP) 322 or acceptance information for tenant 312, which is stored in memory 324 in computer 108-1, processor 320 may inject, set or add a flag in a given header in traffic 310. For example, processor 320 may change a value of a bit in the given header from '0' to '1', or may add the bit to the given header. Moreover, based at least in part on the flag, in subsequent processing processor 320 may direct traffic 310 to a version of software (VoS) 326.

Similarly, after receiving traffic 314, interface circuit 318 may provide traffic 314 to processor 320. Processor 320 may identify tenant 316 based at least in part on information included in traffic 314 (such as information in one or more headers in the one or more packets or frames). Then, based at least in part on predefined preference 328 or acceptance information for tenant 314, which is stored in memory 324, processor 320 may inject, set or add a flag in a given header in traffic 314. For example, processor 320 may change a value of a bit in the given header from '0' to '1', or may add the bit to the given header. Moreover, based at least in part on the flag, in subsequent processing processor 320 may direct traffic 314 to a version of software (VoS) 330.

Next, radio node 118-1 may provide feedback 332 to computer system 112. Interface circuit 318 may provide feedback 332 to processor 320, which may perform an action 334 based at least in part on feedback 330. For example, processor 320 may change the predefined preference 322 for additional traffic from tenant 312, so that this additional traffic is dynamically mapped to the version of software 33-. Alternatively or additionally, processor 320 may change the version of software 330.

While FIG. 3 illustrates communication between components using unidirectional or bidirectional communication with lines having single arrows or double arrows, in general the communication in a given operation in this figure may involve unidirectional or bidirectional communication. Moreover, while FIG. 3 illustrated processor 320 perform at least some of the operations in the mapping techniques, in other embodiments at least some of the operations performed by processor 320 are performed by interface circuit 318. Furthermore, while FIG. 3 illustrated the flag being injected, set or added in one or more headers, in other embodiments the information used to perform the dynamic mapping may be included at another location or position in the one or more packets or frames in traffic 310 or traffic 314.

In some embodiments of the mapping techniques, the dynamic mapping is implemented by injecting, setting or adding a bit in one or more headers in packets or frames associated with a flow or traffic associated with a given tenant. This is illustrated in FIG. 4, which presents a drawing illustrating an example of a technique for dynamically mapping traffic to different versions of software. Notably, a packet 410 may include a header 412 with an identifier (ID) 414 of a first tenant. Based at least in part on identifier 414, interface circuit 318 in computer 108-1 may inject, set or add a flag 416 in header 412. Then, based at least in part on flag 416, processor 320 in computer 108-1 may direct or steer packet 410 to the version of software 326.

Moreover, a packet 418 may include a header 420 with an identifier 422 of a second tenant. Based at least in part on identifier 422, interface circuit 318 in computer 108-1 may inject, set or add a flag 424 in header 420. Then, based at least in part on flag 424, processor 320 in computer 108-1 may direct or steer packet 418 to the version of software 328. Thus, flags 416 and 424 may, respectively, correspond to or specify the version of software.

Figure 4:
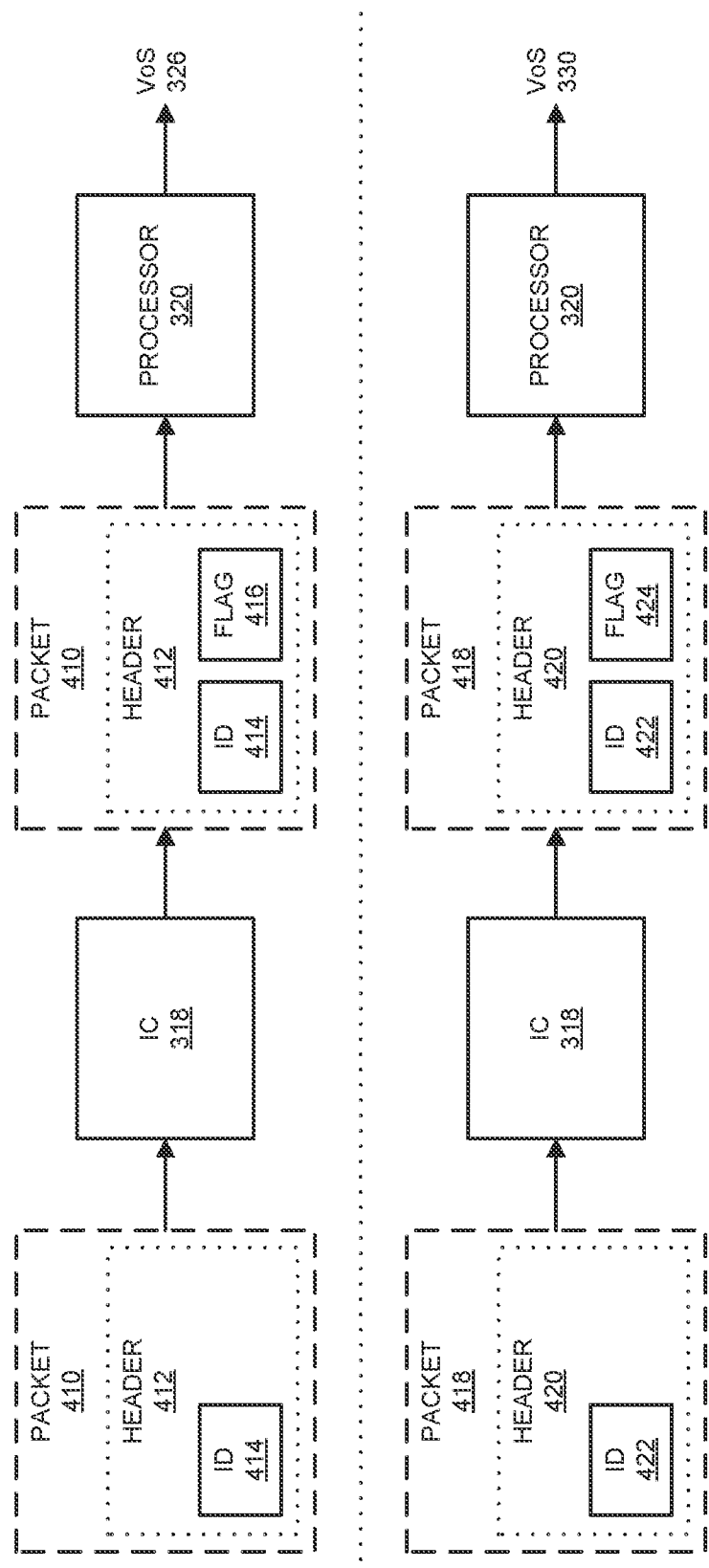
FIG. 4 is a drawing illustrating an example of a technique for dynamically mapping traffic to different versions of software in accordance with an embodiment of the present disclosure.

While FIGS. 3 and 4 illustrate operations being performed sequentially or at different times, in other embodiments at least some of these operations may, at least in part, be performed concurrently or in parallel.

In some embodiments of the mapping techniques, the computer system may be implemented using separate virtual machines for different functions or functionality. Alternatively or additionally, the computer system may include multiple containers for different functions or functionality, so that different applications are isolated from each other. Moreover, the functions, functionality and/or applications may be configured, via application programming interfaces, using metadata. Consequently, the functions, functionality and/or applications in the computer system may be data driven. Furthermore, the different containers or applications may share a common data structure with information, such as the metadata.

Note that the application implemented using the containers may include so-called 'microservices. For example, the applications may include: on-premises operation and administration (such as assisting an electronic device in locating an access point or a radio node in the vicinity, mapping to identify communication dead zones, integrating Wi-Fi and LTE, etc.); disaster recovery (such as assistance in bring access points and radio nodes online, backup configuration, backup services, etc.); and/or security (such as distribution and management of security or encryption keys, a cloud-based authentication service, etc.). In some embodiments, the computer system may allow a tenant to manage or pool a license to an application, so that their customers can share the license. This may allow a given customer to flexibly access the application for, e.g., a different number of units, a time duration, etc.

As shown in slide 2, the target segments may include: enterprise, a tier-1 service provider and/or a tier 2 or 3 managed service provider. The cloud-based computer system may provide multiple infrastructure as a service (IaaS) support on-premises and hybrid (local and cloud-based) support. Moreover, the current software as a service (SaaS) technical stacks may include: Wi-Fi, switching, LTE, analytics, integration, Internet of things, etc. Furthermore, the cloud-based computer system may provide an application store in which third parties can offer applications that can be executed by the cloud-based computer system.

Moreover, slide 3 shows the requirements that the new cloud-based computer system architecture fulfills, relative to the previous architecture.

Furthermore, slide 4 shows the common feature sets that different instances of cloud-based SaaS may include. This may allow the cloud-based SaaS to focus on their business logic, instead of the common infrastructure and building blocks.

Additionally, as shown in slide 6, a typical technical stack may include similar layers of software for the user interface, service processing business logic, and/or from the broker to the controller of the stack. Note that the controller may perform device management. In addition, service processing may map the service model to the device model in order for the device to communicate with the controller. The controller could be legacy software, another SaaS service (such as analytics) or an external entity.

Slide 7 shows that the common business services support items, such as authentication, authorization, and/or role-based access controls. These services may establish the context of a tenant, such as: a paid tenant, what kind of software development kits (SDKs) and entitlements are purchased versus the persona of a value-add reseller, etc. Additionally, these services may offer or provide some common infrastructure, such as notifications.

Moreover, as shown in slide 8, perimeter security may be addressed by having no open ports with external facing services. If a service calls for an external IP/ports, these may be shielded by a global load balancer that includes checks for a distributed denial-of-service attach (DDOS) and other techniques to reduce the attack surface of the cloud-based computer system. In the cloud-based computer system, services that run in the container network space may otherwise be non-routable without the ingress/egress gateway services.

Furthermore, as shown in slide 12, the multiple SaaS platform may provide customers user interface or experience for management. This approach may also reduce the development cycle to rebuild common items.

Additionally, as shown in slide 14, an Istio service mesh may be a service mesh that layers transparently onto existing distributed applications. It may also provide a platform, including application programming interfaces, that let it integrate into a logging platform, or telemetry or policy system. These diverse feature sets may facilitate successful and efficient running of a distributed microservice architecture, and may provide a uniform way to secure, connect, and monitor microservices.

Note that the term service mesh may be used to describe the network of microservices that make up such applications and the interactions between them. As a service mesh grows in size and complexity, it can become harder to understand and manage. Its requirements can include discovery, load balancing, failure recovery, metrics, and monitoring. A service mesh also often has more complicated operational requirements, like AB testing, canary rollouts, rate limiting, access control, and end-to-end authentication.

The service mesh in the cloud-based computer system may offer fine-grained control of traffic behavior with rich routing rules, retries, failovers, and fault injection. In particular, the service mesh may facilitate header injection per tenant, which is then routed to different releases or versions of software.

Slide 15 shows that it can be difficult to rapidly add features. Notably, the turn-around time for features in a monolith release with multiple features typically requires a large build and a long release cycle. The application programming interface-contract-based microservices with selective beta testing for different customers and/or tenants may allow for faster feature deployments Moreover, as shown in slide 16, the under-cloud layers below the container orchestration system may include network and server build out depending on the infrastructure vendor. The layers above the container orchestration system may be a part of the cloud-based computer system that can be replicated elsewhere in the architecture.

Furthermore, as shown in slide 18, the product development paradigm shift may address high availability, scale, load balancing, messaging, etc., which may differ from embedded software and may move towards a distributed architecture. In addition, the product delivery paradigm shift may include a model of how the product delivered to a customer, e.g., a service, which may be distinct from the process of shipping Wi-Fi access points, radio nodes, switches, routers and/or controllers.

Additionally, as shown in slide 39, deployments may be in North America and Europe, while customers may be world-wide. Note that the cloud-based computer system may provide a cloud subscriptions-based service management for access points, radio nodes, switches, routers, etc.

We now describe embodiments of an electronic device, which may perform at least some of the operations in the mapping techniques. FIG. 5 presents a block diagram illustrating an example of an electronic device 500 in accordance with some embodiments, such as one of: base station 106, one of electronic devices 110, one of access points 116, one of radio nodes 118, or computer system 112. This electronic device includes processing subsystem 510, memory subsystem 512, and networking subsystem 514. Processing subsystem 510 includes one or more devices configured to perform computational operations. For example, processing subsystem 510 can include one or more microprocessors, graphics processing units (GPUs), ASICs, microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program instructions 522 or operating system 524), which may be executed by processing subsystem 510. Note that the one or more computer programs or program modules may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as antenna nodes 508, e.g., a pad, which can be coupled to the one or more antennas 520, or nodes 506, which can be coupled to a wired or optical connection or link. Thus, electronic device 500 may or may not include the one or more antennas 520. Note that the one or more nodes 506 and/or antenna nodes 508 may constitute input(s) to and/or output(s) from electronic device 500.) For example, networking subsystem 514 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 500 may be adapted or changed using pattern shapers (such as reflectors) in one or more antennas 520 (or antenna elements), which can be independently and selectively electrically coupled to ground to steer the transmit antenna pattern in different directions. Thus, if one or more antennas 520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a cloud-based computing system, a smartphone, a cellular telephone, a smartwatch, a consumer-electronic device, a portable computing device, an access point, a transceiver, a router, a switch, communication equipment, an eNodeB, a controller, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program instructions 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet as an illustrative example, in other embodiments a wide variety of communication protocols and, more generally, wireless communication techniques may be used. For example, instead of Ethernet, a communication protocol that is compatible with the Internet Protocol is used. Thus, the mapping techniques may be used in a variety of network interfaces.

Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the mapping techniques may be implemented using program instructions 522, operating system 524 (such as a driver for interface circuit 518) or in firmware in interface circuit 518. Thus, the mapping techniques may be implemented at runtime of program instructions 522. Alternatively or additionally, at least some of the operations in the mapping techniques may be implemented in a physical layer, such as hardware in interface circuit 518.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
an interface circuit configured to communicate with a first electronic device associated with a first tenant and a second electronic device associated with a second tenant;
a processor; and
memory configured to store program instructions, wherein, when executed by the processor, the program instructions cause the computer to perform operations comprising:
receiving first traffic associated with the first electronic device and second traffic associated with the second electronic device, wherein the first traffic and the second traffic are addressed to a common computing environment that supports multiple, different tenants, and wherein the multiple, different tenants are customers of a provider associated with the computer;
identifying the first tenant based at least in part on first information included in the first traffic, and the second tenant based at least in part on second information included in the second traffic;
dynamically mapping the first traffic to a first version of software and the second traffic to a second version of the software, wherein the dynamic mapping occurs at runtime;
receiving, associated with the second electronic device, feedback about the second version of the software; and
based at least in part on the feedback, releasing the second version of the software to the multiple tenants, wherein multiple versions of the software, including the first version of the software and the second version of the software, are concurrently released to different tenants at runtime, and
wherein, when a given tenant in the tenants decides to transition between versions of the software, the dynamic mapping provides a seamless transition in less time than is need for the given tenant to perform a software update to transition between the different versions of the software.

2. The computer of claim 1, wherein the dynamic mapping comprises injecting, adding or setting a bit or a flag in a header in a given packet or a given frame in the first traffic or the second traffic.

3. The computer of claim 1, wherein a given tenant comprises one or more customers.

4. The computer of claim 1, wherein given information in the first information or the second information comprises an identifier associated with a given tenant.

5. The computer of claim 4, wherein the identifier comprises: a media access control (MAC) address, an Internet Protocol (IP) address, a tenant identifier, or tenant or customer qualifying information.

6. The computer of claim 4, wherein the given information is included in a header in a given packet or a given frame in the first traffic or the second traffic.

7. The computer of claim 1, wherein the operations comprise:
receiving, from the first electronic device, additional traffic; and
dynamically mapping the additional traffic to the second version of the software.

8. The computer of claim 1, wherein the dynamic mapping is based at least in part on predefined preferences or acceptance information of the first tenant and the second tenant.

9. The computer of claim 8, wherein the predefined preferences or acceptance information comprises the second tenant agreeing or opted-in to using the second version of the software.

10. The computer of claim 1, wherein the operations comprise running or executing the first version of the software and the second version of the software concurrently.

11. A non-transitory computer-readable storage medium for use in conjunction with a computer, the computer-readable storage medium storing program instructions that, when executed by the computer, cause the computer to perform operations comprising:
receiving first traffic associated with a first tenant and second traffic associated with a second tenant, wherein the first traffic and the second traffic are addressed to a common computing environment that supports multiple, different tenants, and wherein the multiple, different tenants are customers of a provider associated with the computer;
identifying the first tenant based at least in part on first information included in the first traffic, and the second tenant based at least in part on second information included in the second traffic;
dynamically mapping the first traffic to a first version of software and the second traffic to a second version of the software, wherein the dynamic mapping occurs at runtime;
receiving, associated with a second electronic device that is associated with the second tenant, feedback about the second version of the software; and
based at least in part on the feedback, releasing the second version of the software to the multiple tenants, wherein multiple versions of the software, including the first version of the software and the second version of the software, are concurrently released to different tenants at runtime, and
wherein, when a given tenant in the tenants decides to transition between versions of the software, the dynamic mapping provides a seamless transition in less time than is need for the given tenant to perform a software update to transition between the different versions of the software.

12. The non-transitory computer-readable storage medium of claim 11, wherein the dynamic mapping comprises injecting, adding or setting a bit or a flag in a header in a given packet or a given frame in the first traffic or the second traffic.

13. The non-transitory computer-readable storage medium of claim 11, wherein given information in the first information or the second information comprises an identifier associated with a given tenant.

14. The non-transitory computer-readable storage medium of claim 11, wherein the operations comprise:
receiving, from the first tenant, additional traffic; and
dynamically mapping the additional traffic to the second version of the software.

15. The non-transitory computer-readable storage medium of claim 11, wherein the dynamic mapping is based at least in part on predefined preferences or acceptance information of the first tenant and the second tenant.

16. The non-transitory computer-readable storage medium of claim 15, wherein the predefined preferences or acceptance information comprises the second tenant agreeing or opted-in to using the second version of the software.

17. The non-transitory computer-readable storage medium of claim 11, wherein the operations comprise running or executing the first version of the software and the second version of the software concurrently.

18. A method for dynamically mapping traffic to different versions of software, comprising:
by a computer:
receiving first traffic associated with a first tenant and second traffic associated with a second tenant, wherein the first traffic and the second traffic are addressed to a common computing environment that supports multiple, different tenants, and wherein the multiple, different tenants are customers of a provider associated with the computer;
identifying the first tenant based at least in part on first information included in the first traffic, and the second tenant based at least in part on second information included in the second traffic;
dynamically mapping the first traffic to a first version of software and the second traffic to a second version of the software, wherein the dynamic mapping occurs at runtime;
receiving, associated with a second electronic device that is associated with the second tenant, feedback about the second version of the software; and
based at least in part on the feedback, releasing the second version of the software to the multiple tenants, wherein multiple versions of the software, including the first version of the software and the second version of the software, are concurrently released to different tenants at runtime, and
wherein, when a given tenant in the tenants decides to transition between versions of the software, the dynamic mapping provides a seamless transition in less time than is need for the given tenant to perform a software update to transition between the different versions of the software.

19. The method of claim 18, wherein the dynamic mapping is based at least in part on predefined preferences or acceptance information of the first tenant and the second tenant.

20. The method of claim 19, wherein the predefined preferences or acceptance information comprises the second tenant agreeing or opted-in to using the second version of the software.

* * * * *